United States Patent
Müller et al.

[19]

[11] Patent Number: 5,487,301
[45] Date of Patent: Jan. 30, 1996

[54] TEST RIG AND PROCESS FOR TESTING MOTOR VEHICLE ASSEMBLIES, IN PARTICULAR INDEPENDENT WHEEL SUSPENSION

[75] Inventors: Andreas Müller, Darmstadt; Vatroslav Grubisic, Reinheim; Gerhard Fischer, Darmstadt, all of Germany

[73] Assignee: Fraunhofer-Gesellschaft zur Foerderung der Angewandten Forschung, Munich, Germany

[21] Appl. No.: 13,099

[22] Filed: Feb. 3, 1993

[30] Foreign Application Priority Data

Feb. 5, 1992 [DE] Germany .......... 42 03 262.8

[51] Int. Cl.⁶ ............ G01M 19/00; G01N 3/00
[52] U.S. Cl. .............. 73/118.1; 73/798
[58] Field of Search .......... 73/8, 11.08, 118.1, 73/146, 669, 798; 180/168; 280/94, 707, 690, 695

[56] References Cited

U.S. PATENT DOCUMENTS

| | | | |
|---|---|---|---|
| 3,555,893 | 1/1971 | Holzman | 73/669 |
| 3,718,033 | 2/1973 | Peterson | 73/669 |
| 3,877,288 | 4/1975 | Schiefen | 73/669 |
| 3,937,058 | 2/1976 | Hillbrands | 73/11.08 |
| 4,353,568 | 10/1982 | Boyce | 280/94 |
| 4,658,656 | 4/1987 | Haeg | 73/798 |
| 4,726,604 | 2/1988 | Asami et al. | 280/707 |
| 4,768,374 | 9/1988 | Fouchey | 73/118.1 |
| 4,798,088 | 1/1989 | Haeg et al. | 73/669 |

FOREIGN PATENT DOCUMENTS

| | | |
|---|---|---|
| 00220794 | 8/1996 | European Pat. Off. . |
| 3025478 | 1/1981 | Germany . |
| 3818661 | 12/1988 | Germany . |
| 0350608 | 1/1990 | Germany . |
| 4014876 | 11/1991 | Germany . |

OTHER PUBLICATIONS

Automobiltechnische Zeitschrift, 82, pp. 469–474, Sep. 1980.

*Primary Examiner*—Richard Chilcot
*Assistant Examiner*—William L. Oen
*Attorney, Agent, or Firm*—Sughrue, Mion, Zinn, Macpeak & Seas

[57] ABSTRACT

A test rig for testing motor-vehicle assemblies includes a loading device for inducing vertical forces, lateral forces, longitudinal forces and braking or driving forces in the motor-vehicle assembly. The test rig includes a control device for controlling the loading device in such a way as to ensure that the vertical forces, lateral forces, longitudinal forces and braking or driving forces are induced in the motor-vehicle assembly according to a predetermined control loading programme. The control loading programme causes different loading cases of the motor-vehicle assembly, which are realistic in terms of the physics of driving, to be simulated repeatedly in a temporally consecutive sequence. The control loading programme is a standardised basic programme adapted, with the aid of vehicle-and/or axle-specific conversion values and test-rig-specific conversion values, to the given motor-vehicle assembly to be tested in the given case. Preferably, a modifying device is provided for adapting the motor-vehicle assembly to the standardised basic loading programme, whereby the modifying device enables adaptation of the basic loading programme in a particularly uncomplicated manner. The modifying device linearises the suspension spring characteristic of the motor-vehicle assembly.

6 Claims, 4 Drawing Sheets

1

TEST RIG AND PROCESS FOR TESTING MOTOR VEHICLE ASSEMBLIES, IN PARTICULAR INDEPENDENT WHEEL SUSPENSION

BACKGROUND OF THE INVENTION

The invention relates to a test rig and a process for testing motor-vehicle assemblies, in particular independent wheel suspensions of motor vehicles, under operational loading condition.

Chassis components of motor vehicles such as stub axles, wishbones, tie rods, fastening elements, axle hubs, body components or frame components are, in the course of driving operations, subject to complex, multi-axial stresses. The forces acting on the chassis are vertical forces $F_Z$, lateral forces $F_Y$, longitudinal forces $F_X$ and braking or driving forces $F_{XB}$, the points of force application are shown in FIGS. 1 and 2 with reference to an automobile.

For different loading cases, the forces listed above differ as regards their relevance (correlation) and frequency. Typical loading cases occurring in the course of motoring operation, which must be taken into account in the process of simulation, are:

1. Driving straight ahead on roads with different surface characteristics, where the principal forces coming into play are vertical forces as well as lateral forces and longitudinal forces.

2. Cornering, where the main forces coming into play are vertical forces and lateral forces.

3. Braking and propulsion, where the main forces coming into play are vertical forces, as well as braking or driving forces.

For testing individual chassis components hitherto, use has so far predominantly been made of test rigs designed for uni-axial loading, which do not take into account either the additional deformations due to the compound arrangement or the complex multi-axial stresses due to multi-axial loading and different points of force application.

However, test rigs for multi-axial loading are also known, such as the rig described in the applicant's EP 0 094 570 B1, which describes an arrangement for simulating the operational stresses in vehicles or vehicle assemblies, it being possible simultaneously to induce by means of said arrangement vertical forces, lateral forces, longitudinal forces and braking or driving forces in a motor vehicle or a motor-vehicle assembly so that entire axle structures or entire vehicles can be tested with the aid of said test rig or other known multi-axial test rigs, whereby the various forces such as vertical force $F_Z$, lateral force $F_Y$, longitudinal force $F_X$ and braking or driving force $F_{XB}$ are transmitted to the motor vehicle assembly via servo-hydraulic actuator devices.

Complex control signals are required for controlling said servo-hydraulic actuator devices in order to simulate the various operational loading conditions such as driving straight ahead, cornering, braking and acceleration. In the process of simulation it is also essential to take appropriate account of the frequency of the various loading conditions in order to ensure that the test corresponds to overall loading conditions such as occur in operational usage.

With a multi-axial loading device for inducing vertical forces, lateral forces, longitudinal forces and braking or driving forces, the requisite complex control signals necessary for controlling the servo-hydraulic actuators have, so as to be able to simulate operational loading conditions, to be obtained at the cost of much time and labour by making measurements on an appropriate motor vehicle during driving operation, it also being necessary to adapt said control signals to the given test rig by carrying out iterative procedures and to process them so as to produce a programme for controlled loading.

An adaptive control process is disclosed in ATZ Automobiltechnische Zeitschrift 82 (1980) 9, pages 469 to 473, which can be applied to test rigs of the most varied multi-axial types for testing operational strength with regard to bodies, chassis or entire vehicles in order to simulate measured operational stresses realistically. It is possible to reproduce driving conditions with considerable accuracy by making use of fast digital computers which calculate the design values for the analogue control loops used, while taking into account the vibration characteristics of the system. Also by means of this adaptive control process, the control signals required for controlling the servo-hydraulic actuators of the rig for testing operational strength must in the given case be obtained from measurements carried out, during operation, on the vehicle type under study and must be adapted by iterative procedures to the given rig for testing operational strength in order to produce a control loading programme.

However, such a control loading programme can only be used for motor-vehicle assemblies of that special type of motor vehicle (i.e. with special vehicle characteristics and special vehicle size), which was used to make the above measurements during operation of the vehicle, as well as for those operational uses and axle loads which applied when said measurements during motoring operation were carried out.

For testing motor-vehicle assemblies pertaining to a different type of motor vehicle and/or with different axle loads and/or different operational uses appropriate labour- and time-intensive measurements during vehicle operation as well as iterative procedures must again be carried out in the given case so as to obtain an appropriate control loading programme. The transfer or adaptation of a control loading programme derived with respect to a given type of motor vehicle, specific axle loads and certain operational usage to a different type of motor vehicle, other axle loads and/or other operational usage can only be effected, due to different design and/or different vibration characteristics of the motor-vehicle where this is at all possible given the present state of the art, with considerable restrictions and difficulties and at considerable expense.

EP 0 220 794 B1 describes, with respect to a rig for testing multi-axial operational strength, the way in which the control signals work during operation of the test rig, but it does not explain in detail how these control signals are obtained.

DE 40 14 876 A1 describes a process and a device for determining and/or monitoring the state of a technical component of a motor vehicle in relation to the body, in particular of the tires with respect to tire inflation pressure and/or of the shock absorbers with respect to shock-absorber defects, by measuring vibrations induced in the chassis of the motor vehicle with respect to parts of the wheel suspension. This is not at all a matter of controlling force-generators pertaining to a rig for testing operational strength but of making actual measurements on a motor vehicle during normal vehicle operation, where measured values detected by sensors are processed in a computer by means of an algorithm and compared with stored previous measured values or computer results.

Lastly, DE 30 25 478 A1 describes a loading test rig for vehicle axles comprising control devices which scan and regulate the movements due to the loading in order to obtain a desired loading. This loading test rig is directly associated with the vehicle to be tested. This specification says nothing about the production of a control loading programme but is merely concerned with producing, in the given case, a required loading of a given vehicle by means of regulating processes.

SUMMARY OF THE INVENTION

The principal object of the invention is to provide a test rig and a process for testing motor-vehicle assemblies, in particular independent wheel suspensions of motor vehicles, under operational loading conditions, thus making it possible to transfer a loading programme, once it has been produced, in relatively simple manner and at relatively low cost to motor-vehicle assemblies, in particular independent wheel suspensions, of the most diverse vehicle types and/or with different axle loads and/or for different operational uses.

According to the invention this object is achieved by means of a test rig for testing motor-vehicle assemblies, in particular independent wheel suspensions of motor vehicles, under loading conditions of operational type, whereby said test rig comprises:

(a) a loading device for transmitting vertical forces, lateral forces, longitudinal forces and braking or propelling forces to the motor-vehicle assembly, in particular to an independent wheel suspension, and (b) a control device for controlling the loading device in such a way that the vertical forces, lateral forces, longitudinal forces and braking or driving forces are transmitted to the motor vehicle assembly, in particular the independent wheel suspension, in accordance with a given control loading programme, by means of which different loading cases (in the form of loading sections, each of which covers a predetermined time) of the motor-vehicle assembly, in particular the independent wheel suspension, are repeatedly simulated in temporal sequence, said loading cases being combined to form loading blocks and realistic in terms of the driving physics;

whereby the control loading programme consists in a standardised basic loading programme adapted with the aid of vehicle- and/or axle-specific conversion values and test rig-specific conversion values to the given vehicle assembly to be tested in each case, in particular said independent wheel suspension.

Furthermore, the above object is achieved, according to the invention by a process for testing motor-vehicle assemblies, in particular independent wheel suspensions of motor vehicles, under operational loading conditions, comprising:

(a) subjecting the motor-vehicle assembly, in particular an independent wheel suspension, to vertical forces, lateral forces, longitudinal forces and/or braking or driving forces, and (b) controlling the vertical forces, lateral forces, longitudinal forces and/or braking or driving forces in accordance with a predetermined control loading programme, by means of which different loading cases of the motor-vehicle assembly, in particular the independent wheel suspension, are repeatedly simulated in temporal sequence, said loading cases being combined to form loading blocks and which are realistic in terms of the physics of motoring;

whereby the control loading programme is formed from a standardised basic loading programme by adapting said standardised basic loading programme to the given motor vehicle assembly to be tested, in particular the independent wheel suspension, with the aid of vehicle- and/or axle-specific conversion values and test-rig-specific conversion values.

The various forces (vertical, lateral, longitudinal and/or braking or propelling forces) are temporally combined in the basic and control loading programmes in such a way that the latter causes loading cases, which are realistic in terms of the physics of motoring, to be repeatedly simulated on the item to be tested. The loading blocks are repeated until the object of the test has been achieved, e.g. until one of the motor-vehicle components of the item to be tested has fractured or the item to be tested has been subjected to loading of an intensity and duration equivalent to a predetermined usage time.

The test rig according to the invention is preferably so designed as to provide apparatus for modifying the spring unit of the motor-vehicle assembly, in particular the vertical spring of an independent wheel suspension, in order to adapt the given motor-vehicle assembly to be tested, in particular said independent wheel suspension, to the standardised basic loading programme, whereby said modifying apparatus is capable of linearising the spring characteristic of the spring unit, in particular the vertical spring of an independent wheel suspension.

It has been found that it is possible to apply, at relatively little cost and in a relatively uncomplicated manner, a loading programme to motor-vehicle assemblies of all kinds of motor vehicles and/or with different axle loads and/or for different operational usage if a control loading programme for actual application is formed by adapting, with the aid of vehicle- and/or axle-specific conversion values and test-rig-specific conversion values, a basic loading programme to the specific type of vehicle and/or the given axle loads and/or the special operational use, whereby, relatively speaking, a particularly advantageous adaptability of the basic loading programme can be achieved if the spring unit of the motor-vehicle assembly to be tested, in particular the vertical spring of an independent wheel suspension to be tested, is modified.

With a spring unit or vertical spring with a non-linear spring characteristic such a modification preferably consists in that the spring characteristic of said spring unit or vertical spring is wholly or partly linearised, which process includes restricting their ride clearances, e.g. by shortening the original bump travel or blocking the spring components or the vertical spring (e.g. of the spring strut of an independent wheel suspension), or linearisation by replacing the original spring(s) with one or several other springs. However, there are also cases in which the spring characteristic of the original spring is such as not to require modification.

BRIEF DESCRIPTION OF THE DRAWINGS

The aforementioned and other characteristics and advantages of the invention are described and explained in detail below with regard to certain preferred embodiments of the test rig and the process according to the invention and with reference to the Figures of the drawing.

DETAILED DESCRIPTION OF THE INVENTION

Figure 1:
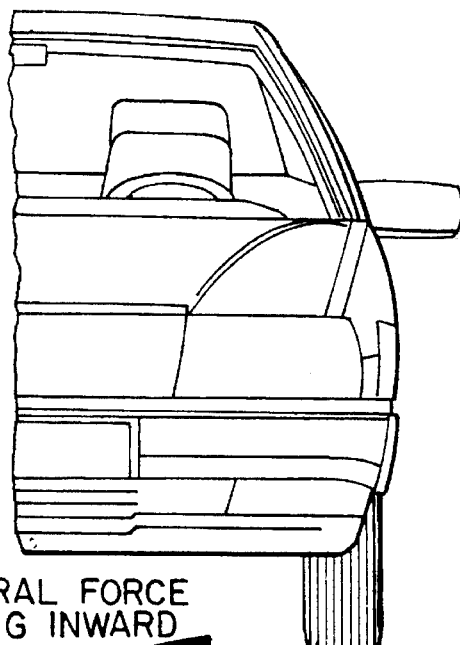
FIG. 1 shows the point of application and the directions of the lateral force and the vertical force for a front wheel of an automobile.
Figure 2:
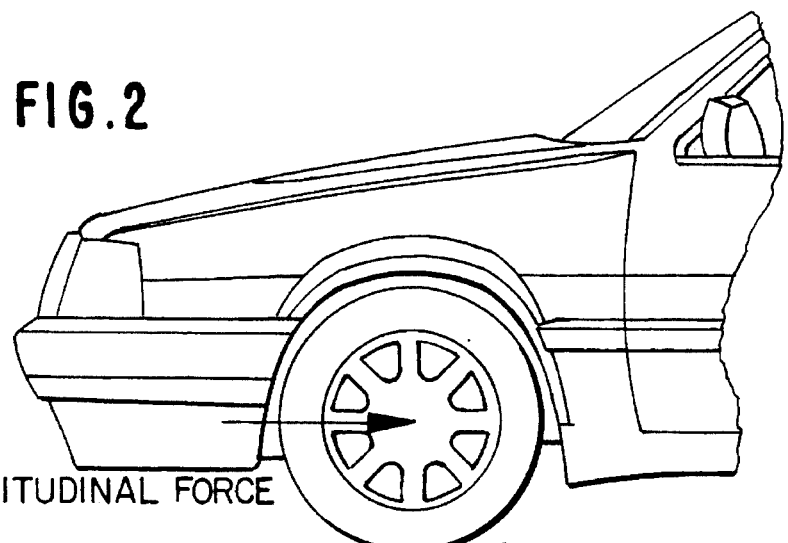
FIG. 2 shows the points of application and the directions of the longitudinal force, the vertical force and the braking and driving forces acting on the front wheel in FIG. 1.
Figure 3:
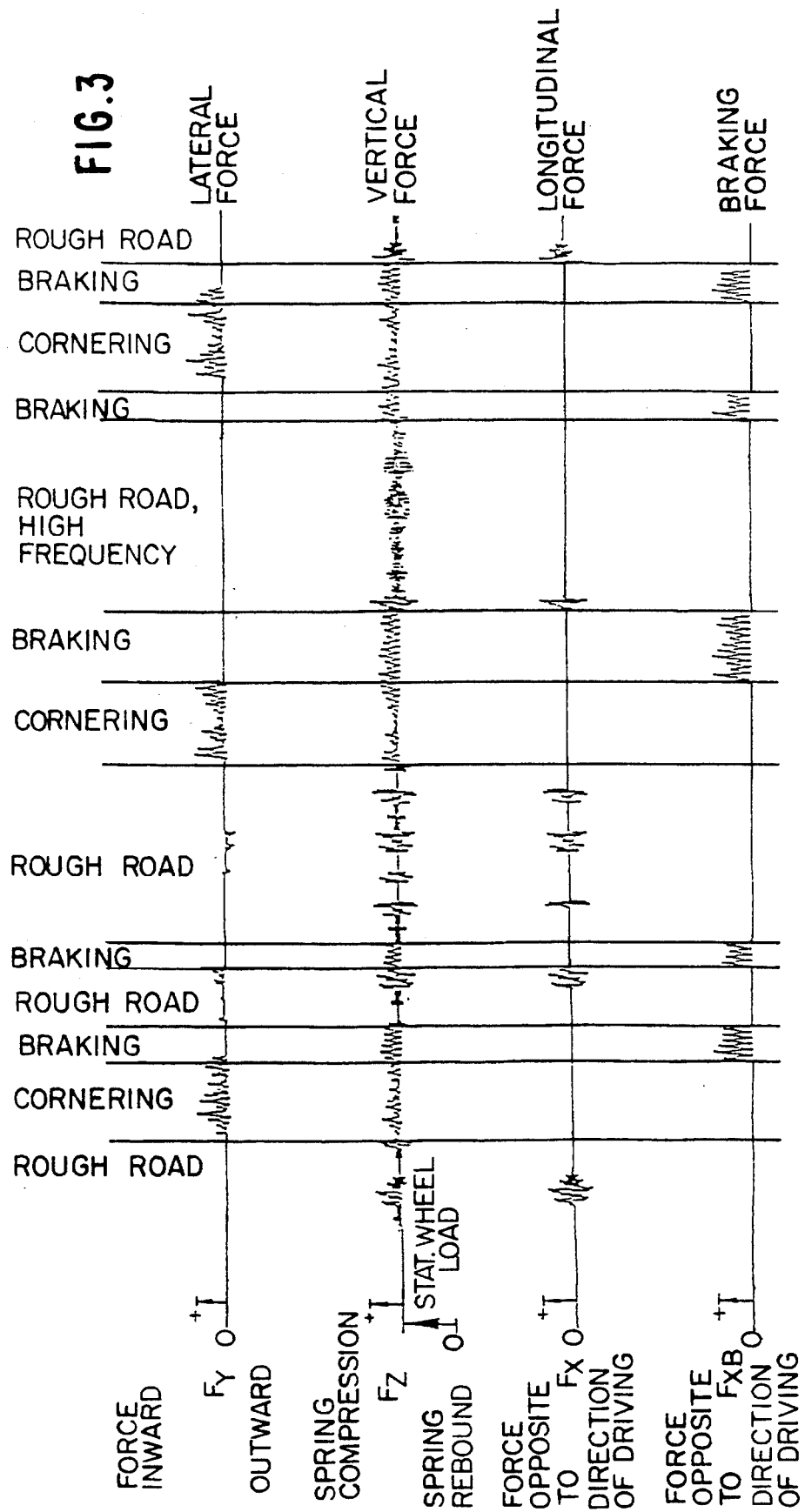
FIG. 3 is an extract from an example of a synthetic operational-type loading sequence (synthetic load programme) which may be applied in respect of an independent wheel suspension of a motor vehicle by using a test rig according to the invention.

As shown in the example in FIG. 3, a synthetic loading sequence of operational type includes several different loading types of, in the given case, predetermined duration, which in the present example are designated "rough road", "cornering", "braking" and "rough road, at high frequency" and may also include other loading types such as "accelerating" or may consist of other loading types.

Different loading sequences are in turn combined to form loading blocks which are produced repeatedly.

Irrespective of its special type (loading case), each loading type is generally characterised by the application, during a predetermined time t, to the item to be tested of one or several specific force combinations of vertical force $F_Z$, longitudinal force $F_X$, driving or braking force $F_{XB}$ and lateral force $F_Y$, said combinations being such as to correspond in the given case to loading cases which are realistic in terms of driving physics. As shown in FIG. 3, individual forces may of course have zero magnitude in any one case. In the following description of the embodiments the item to be tested is assumed to be an independent wheel suspension of a motor vehicle, but the invention is not limited to testing independent wheel suspensions, and the embodiments therefore also apply, in appropriate manner, to the testing of other suitable motor-vehicle assemblies.

Assuming that the loading cases applied to the simplified embodiment described below are "straight ahead," "cornering", "braking" and "accelerating" said loading cases forming a loading sequence of operational type such as shown in FIG. 3, the force combinations to be applied can be shown in the form of the following matrix-type Table 1:

TABLE 1

| | Loading cases: | | | |
|---|---|---|---|---|
| | Straight ahead | Cornering | Braking | Accelerating |
| $F_Z$ (vertical force) | $F_{Z1}(t_j)$ | $F_{Z2}(t_j)$ | $F_{Z3}(t_j)$ | $F_{Z4}(t_j)$ |
| $F_X$ (longitudinal force) | $F_{X1}(t_j)$ | $F_{X2}(t_j)$ | $F_{X3}(t_j)$ | $F_{X4}(t_j)$ |
| $F_{XB}$ (braking or propelling force) | $F_{XB1}(t_j)$ | $F_{XB2}(t_j)$ | $F_{XB3}(t_j)$ | $F_{XB4}(t_j)$ |
| $F_Y$ (vertical force) | $F_{Y1}(t_j)$ | $F_{Y2}(t_j)$ | $F_{Y3}(t_j)$ | $F_{Y4}(t_j)$ |

Accordingly (in this relatively simple example) the loading case "straight ahead" is simulated by applying, during time $t_j$, the force combination $F_{Z1}$, $F_{X1}$, $F_{XB1}$, $F_{Y1}$ to the item to be tested, not all forces necessarily being non-zero.

Generally speaking, in loading case i (where in the present case i=1 for driving straight ahead, i=2 when cornering, i=3 for braking and i=4 for accelerating) force $F_{Ri}(t_j)$ is applied to the item to be tested in the given case for time j and load direction R (z=vertical force, x=longitudinal force, xB=braking or accelerating force, y=lateral force). For instance, in loading case "straight ahead" the servo-hydraulic piston/cylinder device of the test rig which generates the vertical force is controlled in such a way that said arrangement applies force $F_{Z1}(t_j)$ to the item to be tested during time j (see Table 1, left-hand column, top) whereby a loading sub-section of a given loading case (e.g. straight ahead) may comprise several separate time periods inducing different forces, as illustrated by the curves within the various loading sections in FIG. 3.

This given force $F_{Ri}(t_j)$ according to the control loading programme equals a basic force $B_{Ri}(t_j)$ according to Table 2 below, modified by multiplication with a vehicle- and/or axle-specific conversion factor $a_{Ri}$ and a test-rig-specific conversion factor $P_R$ according to Table 3 below (the latter being also described as "test-arrangement-specific conversion factor").

TABLE 2

| | Loading cases: | | | |
|---|---|---|---|---|
| | Straight ahead | Cornering | Braking | Accelerating |
| $F_Z$ (vertical force) | $B_{Z1}(t_j)$ | $B_{Z2}(t_j)$ | $B_{Z3}(t_j)$ | $B_{Z4}(t_j)$ |
| $F_X$ (longitudinal force) | $B_{X1}(t_j)$ | $B_{X2}(t_j)$ | $B_{X3}(t_j)$ | $B_{X4}(t_j)$ |
| $F_{XB}$ (braking or propelling force) | $B_{XB1}(t_j)$ | $B_{XB2}(t_j)$ | $B_{XB3}(t_j)$ | $B_{XB4}(t_j)$ |
| $F_Y$ (vertical force) | $B_{Y1}(t_j)$ | $B_{Y2}(t_j)$ | $B_{Y3}(t_j)$ | $B_{Y4}(t_j)$ |

TABLE 3

| Type of force | Vehicle- and/or axle-specific conversion factors: | | | | Test-rig-specific conversion factor |
|---|---|---|---|---|---|
| | Straight ahead | Cornering | Braking | Accelerating | |
| $F_Z$ (vertical force) | $a_{Z1}$ | $a_{Z2}$ | $a_{Z3}$ | $a_{Z4}$ | $P_Z$ |
| $F_X$ (longitudinal force) | $a_{X1}$ | $a_{X2}$ | $a_{X3}$ | $a_{X4}$ | $P_X$ |
| $F_{XB}$ (braking or propelling force) | $a_{XB1}$ | $a_{XB2}$ | $a_{XB3}$ | $a_{XB4}$ | $P_{XB}$ |
| $F_Y$ (lateral force) | $a_{Y1}$ | $a_{Y2}$ | $a_{Y3}$ | $a_{Y4}$ | $P_Y$ |

In general, the force $F_{Ri}(t_j)$ according to Table 1 which is actually to be applied in any given case can be calculated from the basic force $B_{Ri}(t_j)$ according to Table 2 and the conversion factors $a_{Ri}$ and $P_R$ according to Table 3, as follows:

$$F_{Ri}(t_j) = B_{Ri}(t_j) \cdot a_{Ri} \cdot P_r$$

For instance, the vertical force $F_{Z1}(t_j)$ to be applied corresponds to $F_{Z1}(t_j)=B_{Z1}(t_j) \cdot a_{Z1} \cdot P_Z$.

Only if (a) the basic loading programme, which temporarily combines the various forces, i.e. vertical force $F_Z$, longitudinal force $F_X$, braking or driving force $F_{XB}$ and lateral force $F_Y$ (not all of which have to differ from zero) in such a way as to simulate on the item to be tested loading cases realistic in terms of driving physics, and (b) the vehicle- and/or axle-specific as well as the test-rig- or arrangement-specific conversion magnitudes $a_{Ri}$ and $P_R$, which according to the above equations may in particular be adaptation factors, are available can the given control loading programme formed therefrom ensure realistic loading and/or deformation of the motor-vehicle components and/or assembly, enabling reliable assessment of the life of said motor vehicle component and/or motor-vehicle assembly.

As regards the production of the standardised basic loading programme and the conversion thereof to the actual control loading programme, the following additional explanatory remarks apply:

(1) Production of the Standardised Basic Loading Programme

The production of the basic loading programme is based on the spectrum of loadings to which the axle components of a motor vehicle are subject in the course of their design life, distinguished (a) according to the physical loading cases which apply predominantly during motoring operation (b) within said individual loading cases: loading stages according to their level (represented without dimension, standardised with respect to a maximum value independent of the vehicle) and the frequency with which they occur, two magnitudes (level and frequency of occurrence) which provide the frequency distribution.

Experience shows that the frequency distributions (design load spectrum) used to determine durability life have a form with few high peak values and many low stress levels.

The basic loading programme for carrying out tests is now modified in such a way that the number of higher loads is increased and the number of low loads is reduced. The object of this modification is to reduce the testing time while maintaining the same amount of damage as with the design load spectrum.

(2) Production of the Vehicle-Specific Factors for Conversion of the Basic Loading Programme to the Control Loading Programme The vehicle-specific factors result from geometric, mechanical and physical boundary conditions of the vehicle concerned. A distinction is made according to the different loading directions and loading cases.

Determining parameters:

(a) VERTICAL FORCE:

Loading case 'straight ahead':

- weight of vehicle (static wheel load)

- stiffness of tire (tire spring characteristic)

- empirical factors for describing the quality of the road surface

Loading case 'cornering':

- weight of vehicle (static wheel load)

- spring rates of body suspension (spring between axle and chassis) and stabilisers

- various geometric data such as wheelbase, wheel track, height of centre of gravity of the body, geometric data specific to the axle design Loading case 'acceleration':

- weight of vehicle (static wheel load)

- wheelbase, centre of gravity of the entire vehicle

- driving performance, gear ratio

Loading case braking:

- weight of vehicle (static wheel load)

- wheelbase, centre of gravity of entire vehicle (b) LATERAL FORCE:

Loading case 'straight ahead':

- weight of vehicle (static wheel load)

- empirical factor depending on the static wheel load

Loading case 'cornering':

- as for vertical force, with, in addition:

- characteristics of road (adhesion coefficient)

(c) LONGITUDINAL FORCE:

Loading case 'straight ahead':

- weight of vehicle (static wheel load)

- empirical factor depending on the static wheel load

Loading case 'acceleration':

- as for vertical force, with, in addition:

- characteristics of road (adhesion coefficient)

(d) BRAKING FORCE:

Only loading case 'braking':

- as for vertical force, with, in addition:

- characteristics of road (adhesion coefficient)

As can be gathered from the example in FIG. 3, the different loading cases which are realistic in terms of the physics of driving and incorporated in the control loading programme are combined to form a loading block which comprises the various loading cases in different sequences and with different durations, said loading block being repeated for as long as is provided for in the given test. In the example shown in FIG. 3 such a loading block is composed of the loading cases "straight ahead, cornering, braking", only an extract therefrom being shown in FIG. 3. The loading block may for instance be repeated continually until a motor-vehicle component of the motor-vehicle assembly which is the item to be tested fails or a predetermined driving time or distance has been simulated.

Analogously, when relating a real test track (larger proportion of high loads) to real motoring operation, the test time can be significantly compressed by making use of the loading programme described.

Figure 4:
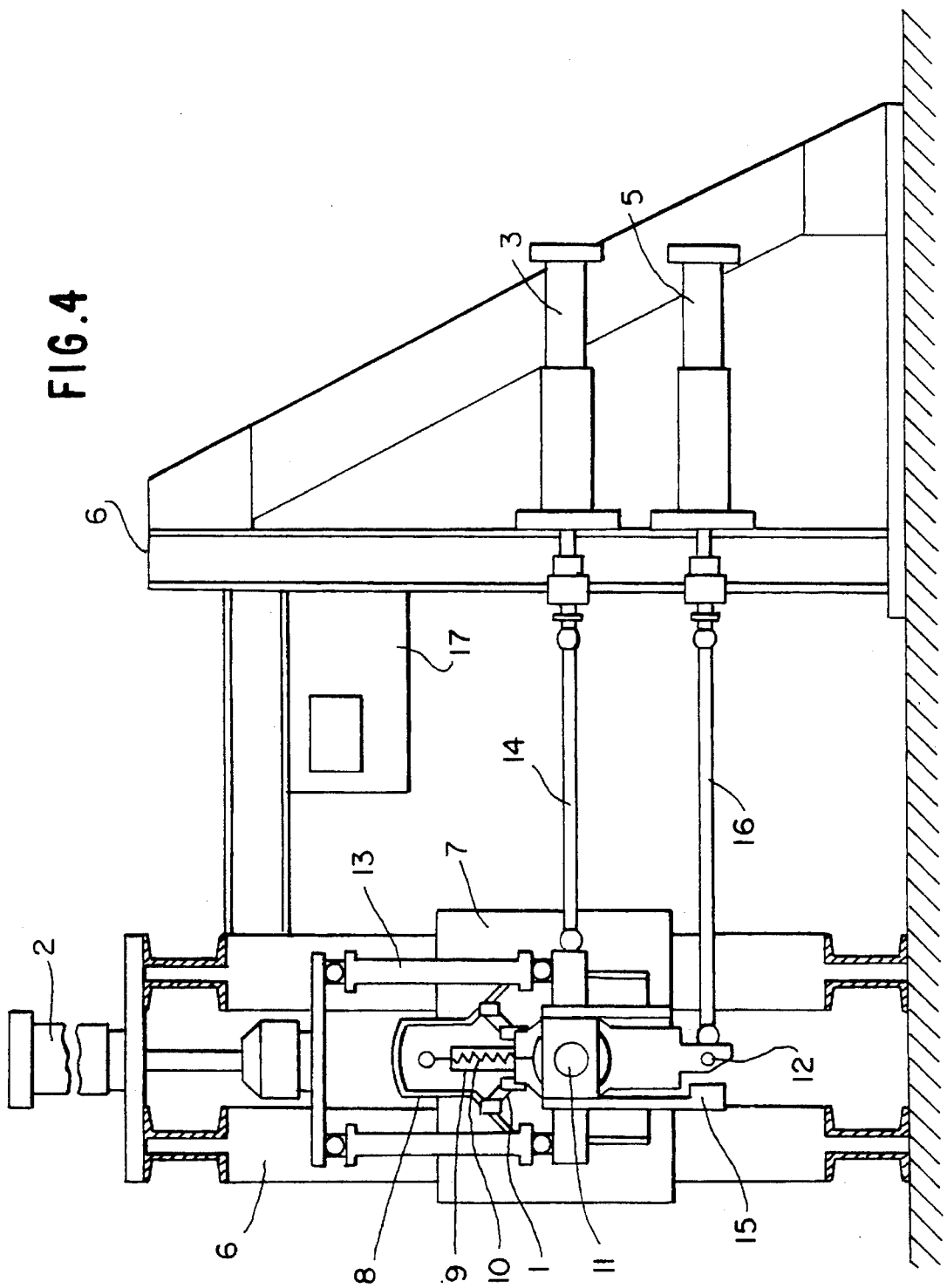
FIG. 4 is the front view of an embodiment of a test rig according to the invention for testing independent wheel suspensions of motor vehicles under operational-type loading conditions.
Figure 5:
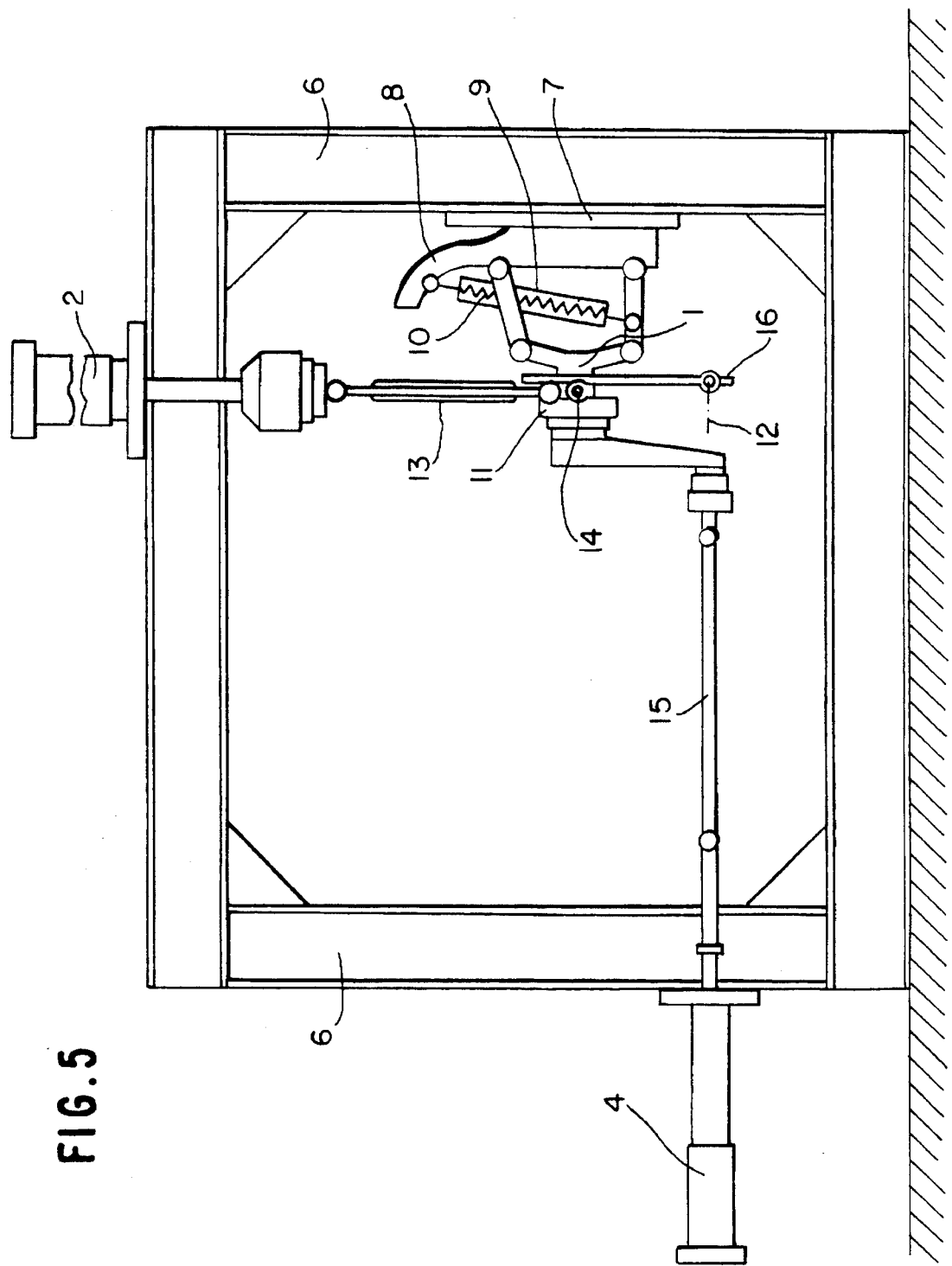
FIG. 5 is a lateral view of the test rig shown in FIG. 4.

Reference is now made to FIGS. 4 and 5, which depict an embodiment of a test rig for testing motor-vehicle assemblies, in particular independent wheel suspensions, under operational loading conditions. Said test rig comprises the following main components:

(a) A loading device for inducing vertical forces, lateral forces, longitudinal forces and braking or driving forces in a motor-vehicle assembly, in the present case an independent wheel suspension 1, whereby the loading device comprises in particular a vertical-force actuator 2, a longitudinal-force actuator 3, a lateral-force actuator 4 and a braking- and driving-force actuator 5, these being preferably in the form of servohydraulic cylinders and fitted within or on a frame, rack or suchlike 6 of the test rig.

(b) A mounting device 7 for attaching subframe 8 of independent wheel suspension 1 to the frame, rack or suchlike 6.

(c) Means 9 for modifying vertical spring 10 of the independent wheel suspension, whereby in the present case this is a means for blocking said vertical spring 10 with a view to "linearising" the spring characteristic. Generally speaking, 9 designates apparatus for modifying the spring unit of a motor-vehicle assembly to be tested, mounting device 7 being provided instead of the independent wheel suspension for mounting on frame, rack or sucklike 5, whereby said apparatus 9 are preferably designed to linearise the spring characteristic of such a spring unit.

(d) A wheel substitute 11 attached to independent wheel suspension 1 and serving to induce force in the latter. The geometric proportions of such a wheel substitute are The same as those of an original wheel/tire unit insofar as said proportions are important for inducing the vertical forces, longitudinal forces, lateral forces and also braking and driving forces; e.g. for the wheel substitute the distance between wheel support plane or point 12 and the centre of the wheel axle is identical.

(e) A vertical-force transmitting device 13, a longitudinal-force transmitting device 14, a lateral-force transmitting device 15 and a braking- and driving-force transmitting device 16 connecting vertical-force generator 2, longitudinal-force generator 3, lateral-force actuator 4 and braking- and driving-force actuator 5 in the given case with substitute wheel 11 in such a way as to ensure that the vertical forces, longitudinal forces, lateral forces and also braking and driving forces are correctly transmitted via substitute wheel 11 to the independent wheel suspension. The forces are preferably transmitted to substitute wheel 11 via rods, plungers or suchlike as well as flexural beam springs and/or spherical bearings capable of angular movement.

(f) A control device 17 (shown only in FIG. 4) for controlling the loading device, i.e. vertical-force generator 2, longitudinal-force actuator 3, lateral-force actuator 4 and braking- and driving-force actuator 5 so as to ensure that the vertical forces, longitudinal forces, lateral forces and braking or driving forces are transmitted to the motor-vehicle assembly, in the present case independent wheel suspension 1, in accordance with a predetermined control loading programme, whereby said control loading programme simulates different loading cases in temporally consecutive sequence. Said control loading programme comprises a temporal consecutive sequence of the above-mentioned forces $F_{Ri}(t_j)$, whereby the loading cases are not restricted to the special ! ceding cases described above but may also include other loading cases such as occur in practice. As a result said loading cases are simulated in a sequence approximating that occurring in practical operation as loading sections in the basic manner shown in FIG. 3. In this context the correlation and frequency of the individual loading sections correspond to the actual operation and use of the vehicle, the assembly of which, e.g. independent wheel suspension, is being tested. At the same time important boundary conditions for reducing the test times in the course of laboratory simulation are taken into account. Moreover, the predominant vibration characteristics of the motor-vehicle assembly, in particular the independent wheel suspension, can be reproduced with the aid of the synthetic loading programme by excitation of a broad frequency band.

The loading programme corresponds to a defined synthetic test track with loading cases realistic in terms of the physics of driving, in which the various forces. (vertical force, lateral force, braking or driving force and longitudinal force, not all of which have to non-zero) are generated in such temporal combination as to ensure that the required loading cases which are realistic in terms of the physics of driving are simulated thereby on the item to be tested. This loading programme (control loading programme) is continually repeated until a given test duration has been achieved. The amount of damage to the motor-vehicle assembly, in particular to the independent wheel suspension, during the entire duration of the test corresponds to the same amount of damage which would occur during the operational usage of the motor vehicle equipped therewith.

Starting from a standardised loading programme, it is possible by virtue of the invention to adapt said loading programme for different (i) vehicle sizes and vehicle characteristics, (ii) operational uses and (iii) axle loads.

Starting from the basic programme which comprises the temporal sequence, the frequencies and conditions of use, the individual loading sections are adapted to the new conditions required in the given case. The adaptation of the loading intensity takes place in line with the physical relationships described in the literature and is complemented by studies being carried out continuously. During this process, the way in which the loading programme is implemented and the correlation of the forces remain constant.

The above adaptation factors (see Table 2) are determined from the relation between the loading intensities newly determined for the various loading sections and contained in the basic loading programme. Furthermore, the frequency of the various loading sections can be adapted to the intended profile of use.

The invention enables in particular:

(1) Simulation of conditions realistic in terms of driving physics in the form of standardised basic loading programmes comprising defined loading sections with corresponding correlation and frequency of the forces acting on the system.

(2) Adaptation of a standardised basic loading programme to different types of vehicles, axle loads and operational conditions, whereby individual loading sections may, in accordance with the different values of loading intensity and frequency, be adapted in targeted manner according to a matrix. This adaptation follows salient physical values determined either from computed images or short-time measurements on vehicles.

(3) Adaptation of the motor-vehicle assembly to be tested, in particular of independent wheel suspensions of motor vehicles, to a standardised basic loading programme, in such a way that on the basis of said standardised basic loading programme an actual control loading programme can be produced in relatively simple manner for all kinds of motor-vehicle assemblies, in particular for independent wheel suspensions.

In this context it should be noted that—apart from rare exceptions—it is virtually impossible to use and adapt a standardised basic loading programme for mutually corresponding assemblies, in particular for independent wheel suspensions, without test-rig-specific conversion values, as has been demonstrated by the studies carried out in connection with the invention. To judge from the results of these studies, a particularly practicable and relatively uncomplicated adaptation of the basic loading programme can be achieved with the aid of the modifying means mentioned above, in particular with the aid of such as serve to linearise the spring characteristic.

In short, the invention provides a test rig for testing motor-vehicle assemblies, in particular independent wheel suspensions of motor vehicles, under operational loading conditions. Said test rig comprises a loading device for inducing vertical forces, lateral forces, longitudinal forces and braking or driving forces in the motor-vehicle assembly, in particular in an independent wheel suspension. In addition, the test rig comprises a control device for controlling the loading device in such a way as to ensure that the vertical forces, lateral forces, longitudinal forces and braking or driving forces are repeatedly induced in the motor-vehicle assembly, in particular in the independent wheel suspension, according to a predetermined control loading programme by means of which the vertical, lateral, longitudinal and/or braking or driving forces are produced in a temporally combined manner so as to cause simulation of different loading cases realistic in terms of the physics of motoring in temporal loading types which are combined to form loading blocks. The control loading programme causes different loading cases of the motor-vehicle assembly, in particular of the independent wheel suspension, to be simulated in temporally consecutive sequence. The control loading programme consists in a standardised basic loading programme adapted, with the aid of vehicle- and/or axle-specific conversion values and test-rig-specific conversion values, to the given motor-vehicle assembly, in particular the independent wheel suspension, to be tested in the given case. Preferably modifying apparatus are provided for adapting the motor-vehicle assembly, in particular the independent wheel suspension, to the standardised basic loading programme, whereby said modifying apparatus enable, for their part, particularly uncomplicated adaptation, relatively speaking, of the basic loading programme. The modifying apparatus is capable of linearising the spring characteristics of the motor-vehicle assembly's spring unit, in particular for linearising the characteristic of the vertical spring of the independent wheel suspension.

We claim:

1. Test rig for testing motor-vehicle assemblies of the type including spring means under operational loading conditions comprising:

a frame for rigidly supporting the motor-vehicle assembly;

modifying means for modifying the spring means of the motor-vehicle assembly for linearising a spring characteristic of said spring means;

loading means for inducing vertical forces $F_Z$, lateral forces $F_Y$, longitudinal forces $F_X$ and braking or driving forces $F_{XB}$ in the motor-vehicle assembly; and control means for controlling the loading means in such a way that the vertical forces $F_Z$, lateral forces $F_Y$, longitudinal forces $F_X$ and braking or driving forces $F_{XB}$ are induced, in accordance with a predetermined control loading program, by means of which different loading cases which are realistic in relation to actual motoring physics and combined to form loading blocks are repeatedly and in temporary consecutive sequence simulated in the motor vehicle assembly, wherein said control loading program comprises as loading cases driving straight ahead, cornering, braking and accelerating and according to which actual forces in accordance with the formula $$F_{Ri}(t_j) = B_{Ri}(t_j) \cdot a_{Ri} \cdot P_r$$

are applied during a corresponding time $t_j$ to the motor vehicle assembly; wherein i denotes the loading case with i=1 for driving straight ahead, i=2 when cornering, i=3 for braking and i=4 for accelerating; wherein further R denotes the load direction with R=z for the vertical force, R=x for the longitudinal force, R=xB for the braking and driving force and R=y for the lateral force; so that the forces to be applied are as follows:

| Forces to be applied in the different loading cases: | | | | |
|---|---|---|---|---|
| Type of force | Straight ahead | Cornering | Braking | Accelerating |
| $F_Z$ (vertical force) | $F_{Z1}(t_j)$ | $F_{Z2}(t_j)$ | $F_{Z3}(t_j)$ | $F_{Z4}(t_j)$ |
| $F_X$ (longitudinal force) | $F_{X1}(t_j)$ | $F_{X2}(t_j)$ | $F_{X3}(t_j)$ | $F_{X4}(t_j)$ |
| $F_{XB}$ (braking or driving force) | $F_{XB1}(t_j)$ | $F_{XB2}(t_j)$ | $F_{XB3}(t_j)$ | $F_{XB4}(t_j)$ |
| $F_Y$ (lateral force) | $F_{Y1}(t_j)$ | $F_{Y2}(t_j)$ | $F_{Y3}(t_j)$ | $F_{Y4}(t_j)$ | with $B_{Ri}(t_j)$ in the above formula being basic forces which are for the corresponding loading cases as follows:

| Basic forces for the different loading cases: | | | | |
|---|---|---|---|---|
| Type of force | Straight ahead | Cornering | Braking | Accelerating |
| $F_Z$ (vertical force) | $B_{Z1}(t_j)$ | $B_{Z2}(t_j)$ | $B_{Z3}(t_j)$ | $B_{Z4}(t_j)$ |
| $F_X$ (longitudinal force) | $B_{X1}(t_j)$ | $B_{X2}(t_j)$ | $B_{X3}(t_j)$ | $B_{X4}(t_j)$ |
| $F_{XB}$ (braking or driving force) | $B_{XB1}(t_j)$ | $B_{XB2}(t_j)$ | $B_{XB3}(t_j)$ | $B_{XB4}(t_j)$ |
| $F_Y$ (lateral force) | $B_{Y1}(t_j)$ | $B_{Y2}(t_j)$ | $B_{Y3}(t_j)$ | $B_{Y4}(t_j)$ | and with $a_{Ri}$ being at least one of vehicle- and axle specific conversion factors and $P_R$ being test-rig-specific conversion factors which are as follows for the different loading cases:

| | Vehicle- and[/or] axle-specific conversion factors for the different loading cases | | | | Test-rig-specific |
|---|---|---|---|---|---|
| Type of force | Straight ahead | Cornering | Braking | Accelerating | conversion factor |
| $F_Z$ (vertical force) | $a_{Z1}$ | $a_{Z2}$ | $a_{Z3}$ | $a_{Z4}$ | $P_Z$ |
| $F_X$ (longitudinal force) | $a_{X1}$ | $a_{X2}$ | $a_{X3}$ | $a_{X4}$ | $P_X$ |
| $F_{XB}$ (braking or driving force) | $a_{XB1}$ | $a_{XB2}$ | $a_{XB3}$ | $a_{XB4}$ | $P_{XB}$ |
| $F_Y$ (lateral force) | $a_{Y1}$ | $a_{Y2}$ | $a_{Y3}$ | $a_{Y4}$ | $P_Y$ | so that a given force $F_{Ri}(t_j)$ according to the control loading program equals a basic force $B_{R1}(t_j)$ modified by multiplication with a vehicle-and/or axle-specific conversion factor $a_{R1}$ and a test-rig-specific conversion factor $P_r$.

2. Test rig according to claim 1, wherein said modifying means is at least one selected from the group consisting of means for wholly linearising the spring characteristic, means for partly linearising the spring characteristic, means for restricting ride clearance of said spring means, means for shortening original bump travel of said spring means, means for blocking a spring component, replacement spring means.

3. Test rig according to claim 1, wherein said motor-vehicle assembly is an independent wheel suspension.

4. Process for testing motor-vehicle assemblies of the type including spring means under loading conditions of operational type, comprising:

rigidly attaching the motor-vehicle assembly to a frame;

modifying the spring means of the motor-vehicle assembly to linearise a spring characteristic of said spring means;

inducing vertical forces $F_2$, lateral forces $F_y$, longitudinal forces $F_x$ and braking or driving forces $F_{XB}$ are induced, in accordance with a predetermined control loading program, by means of which different loading cases realistic in terms of the physics of in motoring and combined to form loading blocks are repeatedly and temporary consecutive sequence simulated in the motor vehicle assembly; and determining a control loading program comprising as loading cases driving straight ahead, cornering, braking and accelerating and according to which actual forces in accordance with the formula $$F_{Ri}(t_j)=B_{Ri}(t_j)\cdot a_{Ri}\cdot P_R$$

are applied during a corresponding time $t_j$ to the motor vehicle assembly; wherein i denotes the loading case with i=1 for driving straight ahead, i=2 when cornering, i=3 for braking and i=4 for accelerating; wherein further R denotes the load direction with R=z for the vertical force, R=x for the longitudinal force, R=xB for the braking and driving force and R=y for the lateral force; so that the forces to be applied are as follows:

| Forces to be applied in the different loading cases: | | | | |
|---|---|---|---|---|
| Type of force | Straight ahead | Cornering | Braking | Accelerating |
| $F_Z$ (vertical force) | $F_{Z1}(t_j)$ | $F_{Z2}(t_j)$ | $F_{Z3(tj)}$ | $F_{Z4}(t_j)$ |
| $F_X$ (longitudinal force) | $F_{X1}(t_j)$ | $F_{X2}(t_j)$ | $F_{X3(tj)}$ | $F_{X4}(t_j)$ |
| $F_{XB}$ (braking or driving force) | $F_{XB1}(t_j)$ | $F_{XB2}(t_j)$ | $F_{XB3(tj)}$ | $F_{XB4}(t_j)$ |
| $F_Y$ (lateral force) | $F_{Y1}(t_j)$ | $F_{Y2}(t_j)$ | $F_{Y3(tj)}$ | $F_{Y4}(t_j)$ | with $B_{R1}(t_j)$ in the above formula being basic forces which are for the corresponding loading cases as follows:

| Forces to be applied in the different loading cases: | | | | |
|---|---|---|---|---|
| Type of force | Straight ahead | Cornering | Braking | Accelerating |
| $F_Z$ (vertical force) | $B_{Z1}(t_j)$ | $B_{Z2}(t_j)$ | $B_{Z3(tj)}$ | $B_{Z4}(t_j)$ |
| $F_X$ (longitudinal force) | $B_{X1}(t_j)$ | $B_{X2}(t_j)$ | $B_{X3(tj)}$ | $B_{X4}(t_j)$ |
| $F_{XB}$ (braking or driving force) | $B_{XB1}(t_j)$ | $B_{XB2}(t_j)$ | $B_{XB3(tj)}$ | $B_{XB4}(t_j)$ |
| $F_Y$ (lateral force) | $B_{Y1}(t_j)$ | $B_{Y2}(t_j)$ | $B_{Y3(tj)}$ | $B_{Y4}(t_j)$ | and with $a_{R1}$ being at least one of vehicle- and axle-specific conversion factors and $P_R$ being test-rig-specific conversion factors which are as follows for the different loading cases:

| | Vehicle- and[/or] axle-specific conversion factors for the different loading cases | | | | Test-rig-specific |
|---|---|---|---|---|---|
| Type of force | Straight ahead | Cornering | Braking | Accelerating | conversion factor |
| $F_Z$ (vertical force) | $a_{Z1}$ | $a_{Z2}$ | $a_{Z3}$ | $a_{Z4}$ | $P_Z$ |
| $F_X$ (longitudinal force) | $a_{X1}$ | $a_{X2}$ | $a_{X3}$ | $a_{X4}$ | $P_X$ |
| $F_{XB}$ (braking or driving force) | $a_{XB1}$ | $a_{XB2}$ | $a_{XB3}$ | $a_{XB4}$ | $P_{XB}$ |
| $F_Y$ (lateral force) | $a_{Y1}$ | $a_{Y2}$ | $a_{Y3}$ | $a_{Y4}$ | $P_Y$ | so that a given force $F_{R1}(t_j)$ according to the control loading program equals a basic force $B_{R1}(t_j)$ modified by multiplication with at least one of vehicle- and axle-specific conversion factors $a_{R1}$ and a test-rig-specific conversion factor $P_R$.

5. Process according to claim 4, wherein the spring means of said motor-vehicle assembly is modified by at least one means selected from the group consisting of means for wholly linearising the spring characteristic, means for partly linearising the spring characteristic, means for restricting the ride clearances of said spring means, means for shortening the original bump travel of said spring means, means for blocking a spring component, replacement spring means.

6. Process according to claim 4, wherein said motor-vehicle assembly which is tested is an independent wheel suspension.

* * * * *